(12) United States Patent
Sahuc et al.

(10) Patent No.: US 7,701,458 B2
(45) Date of Patent: Apr. 20, 2010

(54) METHOD TO TRANSMIT AND RECEIVE FONT INFORMATION IN STREAMING SYSTEMS

(75) Inventors: David Sahuc, Rennes (FR); Thierry Viellard, Osse (FR); Paul Kerbiriou, Thorigné-Fouillard (FR)

(73) Assignee: Thomson Licensing, Boulogne-Billancourt (FR)

( * ) Notice: Subject to any disclaimer, the term of this patent is extended or adjusted under 35 U.S.C. 154(b) by 1021 days.

(21) Appl. No.: 10/544,331

(22) PCT Filed: Jan. 28, 2004

(86) PCT No.: PCT/EP2004/000959

§ 371 (c)(1),
(2), (4) Date: Apr. 5, 2006

(87) PCT Pub. No.: WO2004/071097

PCT Pub. Date: Aug. 19, 2004

(65) Prior Publication Data

US 2007/0008309 A1    Jan. 11, 2007

(30) Foreign Application Priority Data

Feb. 10, 2003   (EP) .................................. 03290324

(51) Int. Cl.
*G06T 11/00*   (2006.01)
(52) U.S. Cl. ..................................................... 345/471
(58) Field of Classification Search ................. 345/418, 345/471
See application file for complete search history.

(56) References Cited

U.S. PATENT DOCUMENTS

| 5,784,062 | A  |   | 7/1998  | Adachi           |         |
|-----------|----|---|---------|------------------|---------|
| 5,838,383 | A  | * | 11/1998 | Chimoto et al.   | 348/553 |
| 5,946,105 | A  | * | 8/1999  | Oishi et al.     | 358/434 |
| 6,141,002 | A  |   | 10/2000 | Kanungo et al.   |         |
| 6,323,864 | B1 | * | 11/2001 | Kaul et al.      | 345/467 |
| 6,714,199 | B1 | * | 3/2004  | Beaman et al.    | 345/469 |
| 6,782,509 | B1 | * | 8/2004  | Hirayama et al.  | 715/210 |

(Continued)

FOREIGN PATENT DOCUMENTS

EP    1087617    3/2001

(Continued)

OTHER PUBLICATIONS

A. Eleftheriadis et al, "Working Draft 5.0 of ISO/IEC 14496-1", ISO/IEC JTCI/SC29/WG11 N1825, Jul. 25, 1997, complete.

(Continued)

*Primary Examiner*—Xiao M Wu
*Assistant Examiner*—Maurice McDowell, Jr.
(74) *Attorney, Agent, or Firm*—Robert D. Shedd; Paul P. Kiel; Guy H. Eriksen

(57) ABSTRACT

A method is disclosed that allows a content provider to transmit font information to a receiver, and that further allows a receiver terminal to receive and apply such information, thus giving improved possibilities for the content provider to define how to render the transmitted text or symbols on a display. The method is good for data streaming systems, in particular MPEG-4 based systems. Advantageously, the received font information can be stored if the terminal contains an appropriate storage device.

22 Claims, 2 Drawing Sheets

U.S. PATENT DOCUMENTS

2001/0052901 A1    12/2001    Kawabata et al.
2002/0087702 A1    7/2002    Mori
2003/0110515 A1*    6/2003    Satoda ........................ 725/135

FOREIGN PATENT DOCUMENTS

| | | |
|---|---|---|
| EP | 1267273 | 12/2002 |
| WO | WO 99/65230 | 12/1999 |
| WO | WO 00/38170 | 6/2000 |
| WO | WO 01/06792 | 1/2001 |

OTHER PUBLICATIONS

"Information Technology-Coding of Audio-Visual Objects—Part 1: Systems" Int'l Standard ISO/IEC, Mar. 2002, pp. I-XV, 1-350, 352-472.

"The Virtual Reality Modeling Language (vrm197)", Int'l Standard ISO/IEC 14772-1: 1997.

Search Report Dated May 10, 2004.

* cited by examiner

METHOD TO TRANSMIT AND RECEIVE FONT INFORMATION IN STREAMING SYSTEMS

This application claims the benefit, under 35 U.S.C. §365 of International Application PCT/EP04/000959, filed Jan. 28, 2004, which was published in accordance with PCT Article 21(2) on Aug. 19, 2004 in English and which claims the benefit of European patent application No. 03290324.7, filed Feb. 10, 2003.

This invention relates to font information that is usable for electronic devices containing a display, and in particular a method for transmitting, receiving and updating said font information.

BACKGROUND

In the MPEG-4 standard ISO/IEC 14496, in particular in part 1 Systems, an audio/video (AV) scene can be composed from several audio, video and synthetic 2D/3D objects that can be coded with different MPEG-4 format coding types and can be transmitted as binary compressed data in a multiplexed bitstream, comprising audio, video and other substreams, e.g. text to be displayed. A substream is also referred to as Elementary Stream (ES), and can be accessed through a descriptor. A scene is generally understood as an audio-visual space that a user can interact with.

The process of synthesizing a single scene from the component objects is called composition, and means mixing multiple individual AV objects, e.g. a presentation of a video with related audio and text, after reconstruction of packets and separate decoding of their respective ES. User interaction, terminal capability, and terminal configuration may be used when determining how to compose a scene at a receiver terminal. The bitstream defined in the mentioned MPEG-4 standard contains an ES called 'Scene Description Stream' being a set of general instructions for composition of scenes, and further contains other substreams, so called Object Description Streams, that contain configuration information being necessary for decoding the AV substreams. In a receiver the configuration substreams are extracted and used to set up the required AV decoders. Then the AV substreams are decoded separately to objects, and the received composition instructions are used to prepare a single presentation from the decoded AV objects. This final presentation, or scene, which is no more under full control of the broadcaster or content provider due to terminal dependent composition, is then played back.

In ISO/IEC 14496-1:2002, which is the current version of the MPEG-4 Systems standard, a hierarchical model for presenting AV scenes is described, using a parametric approach. An InitialObjectDescriptor (IOD) contains descriptors for the Scene Description Stream and a dedicated OD Stream. The Scene Description Stream contains a scene description consisting of an encoded tree of nodes. 'Node' means a processing step or unit used in the MPEG-4 standard, e.g. an interface carrying out time synchronisation between a decoder and subsequent processing units. Nodes can have attributes, referred to as fields, and other information attached. A leaf node in this tree corresponds either to elementary AV data by pointing to an OD within the OD stream, which in turn contains an ES Descriptor pointing to AV data in an ES, or to a graphical 2D/3D synthetic object, e.g. a cube; a curve or text. Intermediate nodes, or scene description nodes, group this material to form AV objects, and perform e.g. grouping and transformation on such AV objects.

Text to be displayed is contained in a Scene Description ES. The reproduction of text is described with the FontStyle node. In the FontStyle node semantics, the family field permits to the content creator to select the font the terminal uses to display, or render, the text. If the font is available on the client platform, it is used to render the given text strings. Otherwise a default font has to be used. In contrast to many other nodes of the Scene Description, the FontStyle node fields are static, i.e. they cannot be modified by updates.

SUMMARY OF THE INVENTION

In various applications a content provider wishes to determine the style or font in which transmitted text is displayed at a receiver. But usually receivers can only display few fonts and styles since they lack corresponding information. This problem is solved by the present invention as disclosed in claims 1 and 2. Apparatuses using the inventive method at the transmitter or receiver side are disclosed in claims 9 and 10, respectively.

A system is proposed that is able to stream font information towards a terminal that can download the information and use it for determining how to display text. The font information refers to one or more symbols, usually a set of characters, but also typographic symbols, or dingbats, and may comprise specifications for e.g. typeface, or shape, size, color, bold and italic style, line spacing, proportional pitch or fixed pitch. A font may be used for all text, or may be linked to a certain text content that needs such information in order to be rendered on a device.

The inventive system comprises format data for one or more fonts, means for integrating the data into bit streams, e.g. being composed of time stamped multiplexed packets, means for transmission, transport and reception of said bit streams, a terminal accepting said bit streams as input and containing means, e.g. decoders, to manage font and other content data and to compose managed content, and a rendering device for presenting said composed content.

BRIEF DESCRIPTION OF THE DRAWINGS

Exemplary embodiments of the invention are described with reference to the accompanying drawings, which show in FIG. 1 an exemplary general font streaming system framework.

DETAILED DESCRIPTION OF THE INVENTION

Figure 1:
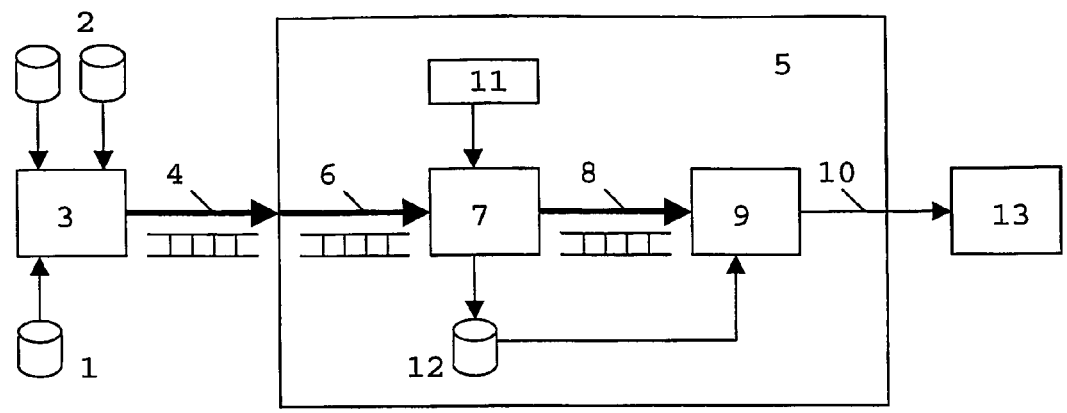

FIG. 1 shows the components of a general font streaming system according to the invention. Font data 1 are packed, e.g. multiplexed, together with AV and scene data 2, the scene data including text, to a bitstream 4 in an appropriate device 3, containing e.g. a multiplexer and a server for transmission. The transmission may include broadcast, and the bitstream 4 and its substreams may be structured, e.g. as multiplexed packets.

At the receiving device 5 the bitstream is demultiplexed to ES, e.g. control, audio, video and font streams, wherein control ES comprise Scene Description, including text, and OD streams, and said ES are distributed to the concerned managers. Individually accessible portions of an ES are referred to as Access Units (AUs) 6, which are then decoded by a Decoder Manager 7 into a platform dependent, presentable format. For the specific decoding required by an ES, the Decoder Manager 7 is setup using the Decoder Specific Information 11 (DSI). Said DSI 11 can be setup or modified, e.g. using information received in the control substreams of the bitstream. The Decoder Manager 7 generates Composition Units (CUs) 8 being input to a Compositor 9, which in turn generates an input signal 10 for a rendering device 13, e.g. PC or TV. Since the CUs may be generated before being required by the Compositor 9, they may be buffered in Composition Buffers. In the inventive case of the data being font data it may be advantageous to store the font data at a local Storage Device 12, e.g. memory, flash, disc or hard-disc, for later usage. The font data can be used for composition in the Compositor 9, e.g. when a content provider specifies the font to be used for certain text. As the Compositor 9 is platform dependent, the Decoder Manager 7 can, independently from the streaming system, generate the CU format the Compositor 9 requires, so that the text is rendered as intended by the content provider.

The MPEG-4 Systems standard defines that management times may be associated with the AUs 6 that are used by the Decoder Manager 7 as times at which the data have to be decoded. The data, thus converted to CUs 8 and prepared for the Compositor 9, are transmitted to the Composition Buffer. For CUs there may be composition times defined that the Compositor 9 uses to determine at what time a CU has to be used to render the content. The server 3 sending the packets to the client must ensure the packets will arrive at the client terminal 5 soon enough for the information to be available to the Compositor 9 in time. This issue can be treated at content creation time.

Figure 2:
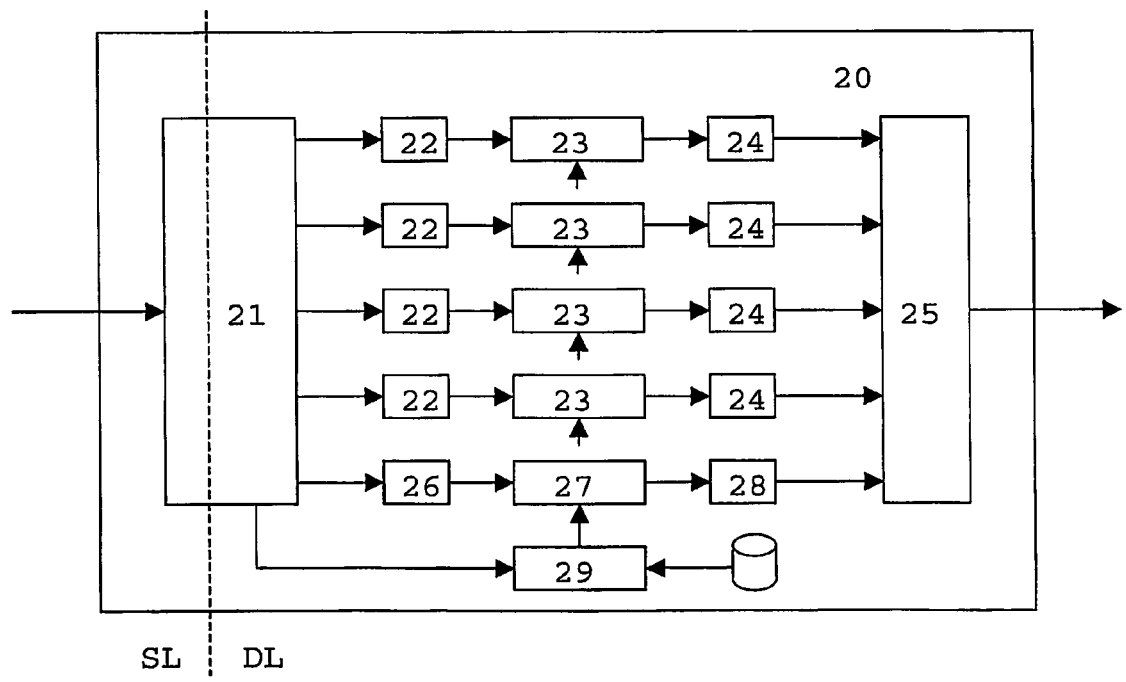
FIG. 2 the general structure of an MPEG-4 terminal.

For the case of the invention being used for MPEG-4 or similar stream oriented systems, the terminal structure is depicted in FIG. 2. The terminal 20 contains an interface 21, referred to as DMIF Application Interface. It is used for the stream data packet format conversion between the synchronization layer SL and the delivery layer DL. Further it demultiplexes the bitstream to substreams, or ES. Substreams containing scene data, along with the text, are sent to appropriate decoding buffers 22,26, and then to decoders 23,27 at specified times. Each decoder is for a certain type of ES, and is setup only when required. The information specifying a decoder may be received in a dedicated ES, e.g. OD stream, by a dedicated manager 29 prior to usage of the decoder. The decoder output is fed to a composition buffer 24,28 and then to the compositor 25 at a specified time, namely at its respective composition time. In this embodiment of the invention there is one decoding buffer 26, decoder 27 and composition buffer 28 used for downloading font information.

In one embodiment of the invention the received font data are stored at the receiver for later usage, while in another embodiment only the last received font is stored, and other fonts must be downloaded whenever the content requires them to be used. In a third embodiment a downloaded font is stored until the client is disconnected from the content. In a fourth embodiment the bitstream may contain a notification whether the font information should be stored or not. In a fifth embodiment of the invention the user may control, i.e. enable or disable, this download of font data.

Figure 3:
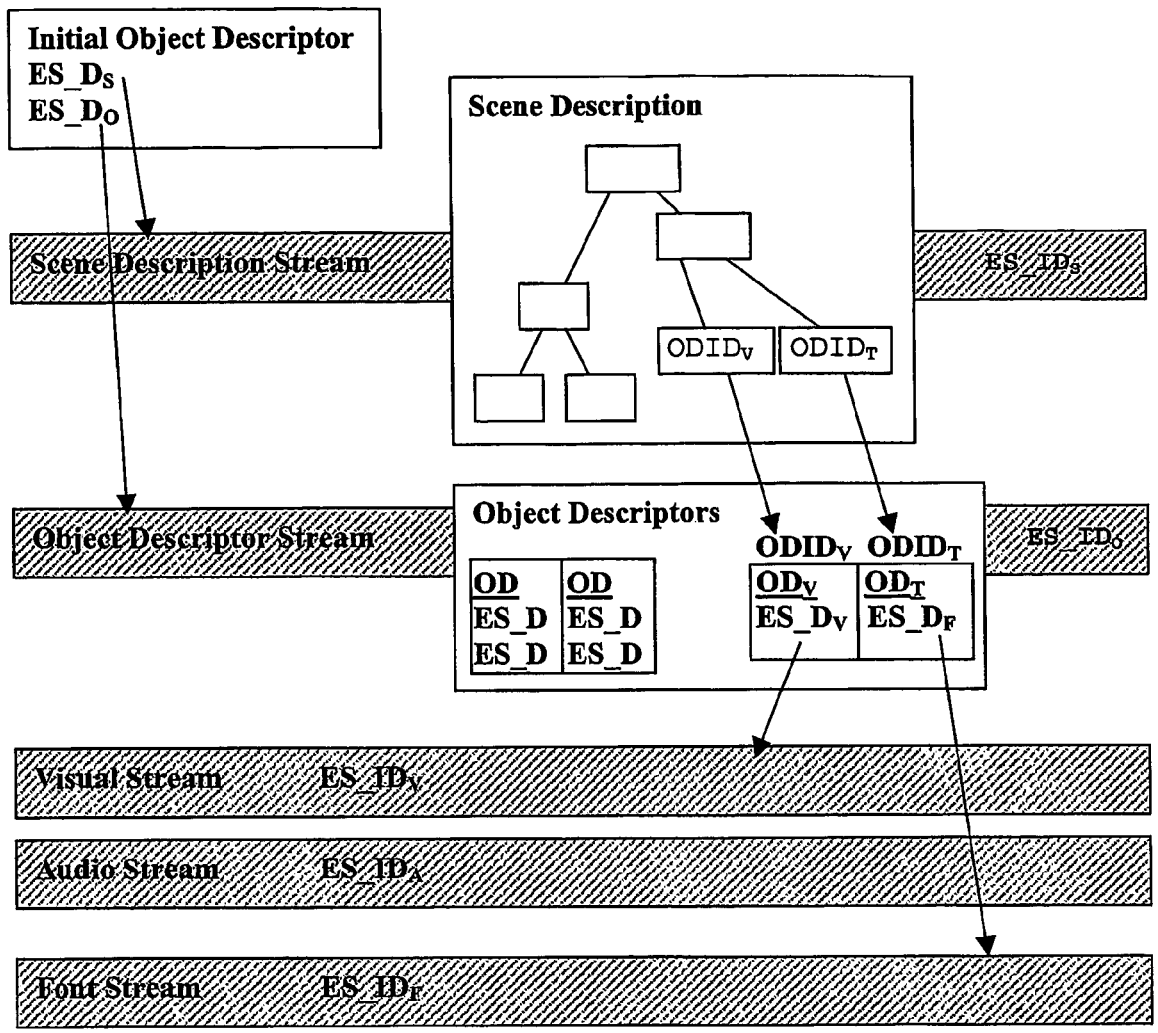
FIG. 3 an MPEG-4 Object Descriptor Framework including a font stream.

FIG. 3 shows the Object Descriptor Framework of an MPEG-4 system containing also font data. It consists of an Initial Object Descriptor and five Elementary Streams (ES). The Initial Object Descriptor contains two Elementary Stream Descriptors (ES_D) pointing to ES, notably $ES\_D_S$ having the value $ES\_ID_S$ and thus pointing to the Scene Description Stream, and $ES\_D_O$ having the value $ES\_ID_O$ and thus pointing to the Object Descriptor Stream. The Scene Description Stream contains a scene description that describes geometry, animation and interactivity of the scene and also links to each object of the scene to be reproduced, by specifying how to obtain the object from ES. The leaf nodes of the scene description hierarchy tree linked to media objects use Object Descriptor Identifiers (ODID) pointing to Object Descriptors being received in the Object Descriptor Stream. One Object Descriptor Identifier $ODID_V$ points to an Object Descriptor $OD_V$ for a visual object, and another Object Descriptor Identifier $ODID_T$ points to an Object Descriptor ODT for a text object. Each Object Descriptor contains one or more ES Descriptors ES_D that are references to ES to be reproduced in the scene. The text object is included inside a Scene Description Stream containing the actual text node and refers to an ES, namely a Font Stream containing the respective font. The two streams are referenced by the ES descriptors $ES\_D_S$ and $ES\_D_F$ having the value of the respective identifiers $ES\_ID_S$ and $ES\_ID_F$.

When a font is referenced in e.g. multimedia content, the reference can be the ES_ID as in FIG. 3 or the name of the font as a string value, or both. The font data corresponding to the referenced font may have been inserted as an ES in the MPEG-4 stream before, with the corresponding ES_ID and optionally an additional name string. Advantageously the font data, name and related information can be stored for later usage. In that case the font can be referenced e.g. by name. Advantageously, no filename is streamed, so that system compatible filenames can be selected for storage.

A dedicated unit at the receiver, referred to as font manager, may handle all font related issues, e.g. selecting a standard font, checking if a special required font was already stored before, receiving a new font, updating stored fonts etc.

The specific font related information, mentioned above as DSI and used for decoder setup, may comprise e.g.

the font type, i.e. internal format of the font data, being different for e.g. TrueType fonts, OpenType fonts or zipped fonts etc.;

a font storage information, specifying whether or not the font should be stored for later usage;

the font name, i.e. a string to be used as a reference to the font; and system specific information for the font manager, e.g. if the font should be used only for certain characters or symbols, or e.g. for capitals only.

In MPEG-4 systems the DSI is transported in the OD stream. According to the invention, there are two possibilities to transmit the information specifying the font decoder: either all said information is contained in the DSI, and the font AU contains raw font data, or the DSI contains an indication that said information is together with the raw font data within the AU. An indication which of the two solutions is used can be encoded in the fontFormat variable within the DSI.

With the first solution the settings for the font decoder are self-sufficient, i.e. completely defined in the OD structure, and therefore all AU packets containing font information have the same internal format, defined by the fontFormat value. This means that it is not possible to modify dynamically the format of the received font, i.e. the font used for text rendering, but on the other hand it requires only a simple type of decoder.

For the second solution only the fontFormat variable is used from the DSI, and the other font related information in the DSI is ignored. Instead, this information is contained in the AU packets for font information and can be extracted e.g. from the packet headers. This can be called a self-contained font. In this case it is sufficient to use a specific reserved value for fontFormat in the DSI. This solution means that the font stream AU packets may have different internal formats, and therefore the decoder must be more complex than in the first solution, since it must extract some of its required DSI from the packets. But advantageously dynamic font modification is possible, since a newly received font can be immediately used.

For an MPEG-4 implementation of the invention few enhancements are necessary to the standard, as described in the following. Said enhancements refer to the stream type, the AU format, the decoder type and the node semantics.

Since a new type of ES is used, a new value of the streamType parameter must be defined, which is used by the terminal to identify the substream as being a font ES, create the required decoder and connect it to the ES. Based on the above-mentioned standard, the proposed new streamType can be added as follows:

TABLE 1

| streamType value | Stream type description |
|---|---|
| 0x00 | Forbidden |
| 0x01 | ObjectDescriptorStream |
| 0x02 | ClockReferenceStream |
| 0x03 | SceneDescriptionStream |
| 0x04 | VisualStream |
| 0x05 | AudioStream |
| 0x06 | MPEG7Stream |
| 0x07 | IPMPStream |
| 0x08 | ObjectContentInfoStream |
| 0x09 | MPEGJStream |
| 0x0A | Interaction Stream |
| 0x0B | FontStream |
| 0x0C-0x1F | reserved for ISO use |
| 0x20-0x3F | User private |

An ObjectTypeIndication is not required for such stream, so that the value 0xFF (no object type specified) can be used. A simple way to transport font information is to embed the font file into an AU, thus creating a new AU type. Such AU can be split into synchronization layer (SL) packets during streaming as described in the MPEG-4 standard. Further, a new decoder has to be defined to manage the font AUs. The decoder extracts the font data from the AU using DSI configuration. If the DSI is implemented e.g. as a class in an Object Oriented language, it may have the following format:

```
Class Font_DecoderConfig extends DecoderSpecificInfo :
bit(8)tag=DecSpecificInfoTag {
    bit(7) fontFormat;
    if (fontFormat != 0x00) {
        bit(1) storeFont;
        bit(8) fontNameLength;
        bit(8) fontName[fontNameLength];
        bit(8) fontSpecInfo[sizeOfInstance - fontNameLength -1];
    }
}
```

The fontFormat variable contained in the DSI may be specified as follows:

TABLE 2

| fontFormat | AU content | Decoder behaviour |
|---|---|---|
| 0x00 | Self Contained Font | Use 1 AU as Self Contained Font |
| 0x01 | TrueType Font (TTF) | Use 1 AU as TrueType font |
| 0x02 | Font (FON) | Use 1 AU as Font |

TABLE 2-continued

| fontFormat | AU content | Decoder behaviour |
|---|---|---|
| 0x03 | Zipped TTF | Uncompress 1 AU with ZIP algorithm, then use it as TTF |
| 0x04 | Zipped FON | Uncompress 1 AU with ZIP algorithm, then use it as FON |
| 0x05-0x7F | User private | Proprietary font formats |

The meaning of the other variables used above is:
storeFont—defining whether or not to store the font for later usage,
fontNameLength—indicating the length of the fontName field,
fontName—indicating the name of the font, and
fontSpecInfo—being an opaque container with information for a specific font handler.

For the fontFormat variable having values of 0x01 to 0x04, the decoder needs all DSI information to process data, and for the fontFormat variable having the value 0x00, the decoder may find the information it requires within the AUs. An exemplary font AU format according to the invention is described below.

If the terminal can store fonts, the storeFont flag may be used to decide whether or not to store a received font, and the name received in the fontName field should be attached to the font data, e.g. by associating it to the file or selecting a meaningful file name. The fontSpecInfo field may be empty by default, and may be used for any user private implementation, indicated by fontFormat having a value from 0x05 to 0x07. In the case of the AU content being a self-contained font, and the AU being implemented e.g. as a class in an Object Oriented language, each font AU may contain data of the following structure:

```
Class FontAccessUnit( ) {
    bit(7) fontFormat;
    bit(1) storeFont;
    bit(8) fontNameLength;
    bit(8) fontName[fontNameLength];
    bit(8) fontSpecInfoLength;
    bit(8) fontSpecInfo[fontSpecInfoLength];
    bit(8) fontData[sizeOfInstance - fontNameLength -
        fontSpecInfoLength - 2]
}
``` fontSpecInfoLength defines the length of the fontSpecInfo field, and fontData is the raw font data. The other fields have the same meaning as in the DSI.

Finally, the FontStyle node semantics described in the standard need modification to enable font streaming. The corresponding paragraph refers to the VRML 97 standard (ISO/IEC 14772-1:1998).

The following behavior is added to the node:

"The family field can also contain ObjectDescriptorIdentifier (ODID) referring to a stream of type 'FontStream', containing the font information."

For an optimal functioning of the node, the first SFString value of the family field should contain the font name as described in the VRML97 standard. The second value should contain the ODID pointing to the stream containing the font. In this embodiment, the terminal can investigate if the font named in the first value already exists in the terminal, and then can reuse if. Otherwise, it can process the font stream as described in the MPEG-4 System standard, with the inventive feature enabled, and store it. For optimized font management in the client terminal, the structural representation of the font information, i.e. the fontStyle node, should reference the font needed for text rendering first by its name, and in a second position by its stream identifier ES_ID. An exemplary scene sample using the font streaming feature may contain the following fragment:

```
fontStyle FontStyle {
    family ["Times New Roman","ODID:104"]
    size 25.0
    spacing 1.25
    style "BOLD"
}
```

In this example, the terminal should use the font with the name 'Times New Roman' to render the text strings, with the given parameters for size, spacing and style. If the font is not available in the receiver, the MPEG-4 terminal may connect to the stream with ODID '104' to retrieve the required font information.

The inventive font-streaming feature can also be included into MPEG-4 authoring tools: when the author defines a specific font for text strings, the tool may insert the font family name in the first part of the family field, create a new ES containing the font information, and insert the ODID for said ES into the second part of the family field.

Advantageously, any font format can be streamed, e.g. TrueType font, Basic font, OpenType font, Asian characters, scalable fonts, symbol fonts etc., as long as the receiving terminal can identify and manage such format.

More advantageously, the invention can be used for all kinds of devices that are capable of displaying information content, especially content comprising text or symbols, and that may receive font information, e.g. TV, DVB, computer displays, navigation devices, and hand-held devices such as mobile phones, mobile computers, Personal Digital Assistants (PDAs), MP3 players or other music rendering devices with display.

The invention is particularly good for all MPEG-4 streaming systems.

The invention claimed is:

1. A method for transmitting font information in a broadcast system, comprising the following steps:
    defining a font for text or symbol content to be presented on a display;
    providing font information comprising font format data of said font, the font format data representing single characters or symbols or sets thereof;
    converting said font information to a format suitable for transmission in a font information stream;
    creating from said converted font information a font information stream;
    adding to a scene description stream that comprises a text object at least a first identifier pointing to a video stream and a second identifier pointing to the font information stream;
    multiplexing said video stream, said font information stream and said scene description stream into a multiplexed stream; and
    transmitting said multiplexed stream.

2. Method according to claim 1, wherein a font defines the rendering characteristics for characters or symbols, the characteristics comprising at least one of the following items: typeface, shape, size, colour, bold style, italic style, line spacing, or pitch type.

3. Method according to claim 1, wherein control information is transmitted, the information determining whether or not the receiver should store said font information.

4. Method according to claim 1, wherein said font information comprises parameters, wherein exemplary parameters comprise size, colour, style or line spacing, while the typeface, shape or pitch information is available at the receiver.

5. Method according to claim 1, wherein said identifier pointing to the font information stream points to a descriptor, which identifies the font information stream.

6. Method according to claim 1, wherein the font information stream is encoded and contains time information indicating a required time for being decoded.

7. An apparatus for transmitting in a broadcast system font information for electronic devices, comprising
    means for defining a font for text or symbol content to be presented on a display;
    means for providing font information comprising font format data of said font, the font format data representing single characters or symbols or sets thereof;
    means for converting said font information to a format suitable for transmission in a font information stream;
    means for creating from said converted font format a font information stream;
    means for adding to a scene description stream that comprises a text object at least a first identifier pointing to a video stream and a second identifier pointing to the font information stream;
    means for multiplexing said video stream, said font information stream and said scene description stream into a multiplexed stream; and
    means for transmitting said multiplexed stream.

8. Apparatus according to claim 7, wherein a font defines the rendering characteristics for characters or symbols, the characteristics comprising at least one of the following items: typeface, shape, size, colour, bold style, italic style, line spacing, or pitch type.

9. Apparatus according to claim 7, wherein said font information comprises parameters, wherein exemplary parameters comprise size, colour, style or line spacing, while the typeface, shape or pitch information is available at the receiver.

10. Apparatus according to claim 7, wherein said identifier pointing to the font information stream points to a descriptor, which identifies the font information stream.

11. Apparatus according to claim 7, further comprising means for receiving within a data stream control information determining whether or not the receiver should store said font information, wherein the received control information is provided to said means for storing font information.

12. A method for adding or modifying font information in electronic devices containing or being connectable to a display, comprising the following steps:
    receiving in a multiplexed signal a video stream, a scene description stream and a font information stream, wherein the font information in said font information stream comprises font format data for rendering or displaying single characters or symbols or sets thereof;
    determining that said scene description stream comprises an identifier pointing to said font information stream and referring to a text object within the scene description stream;
    separately decoding said video stream, said scene description stream and said font information stream;
    extracting the text object from the scene description stream;

storing said font information before or during or after said conversion; and rendering said text object for being displayed together with said video stream, wherein said font format data from the font information stream are used.

13. Method according to claim 12, wherein said identifier pointing to the font information stream points to a descriptor, which identifies the font information stream.

14. Method according to claim 12, wherein a font defines the rendering characteristics for characters or symbols, the characteristics comprising at least one of the following items: typeface, shape, size, colour, bold style, italic style, line spacing, or pitch type.

15. Method according to claim 12, wherein control information is transmitted, the information determining whether or not the receiver should store said font information.

16. Method according to claim 12, wherein said font information comprises parameters, wherein exemplary parameters comprise size, colour, style or line spacing, while the typeface, shape or pitch information is available at the receiver.

17. Method according to claim 12, wherein the font information stream is encoded and contains time information indicating a required time for being decoded.

18. An apparatus for adding or modifying font information in electronic devices containing or being connectable to a display, comprising means for receiving in a multiplexed signal a video stream, a scene description stream, and a font information stream, wherein the font information in said stream comprises font format data for rendering or displaying single characters or symbols or sets thereof;

decoding means for separately decoding said video stream, said scene description stream and said font information stream, wherein said font information is converted to a format such that it can be utilized for processing;

means for storing said font information before or after said conversion;

means for determining that said scene description stream comprises an identifier pointing to said font information stream and referring to a text object within the scene description stream;

means for extracting the text object from the scene description stream; and means for rendering said text object for display, wherein the means defines how to display said characters or symbols or sets thereof using said font format data from the font information stream.

19. Apparatus according to claim 18, wherein a font defines the rendering characteristics for characters or symbols, the characteristics comprising at least one of the following items: typeface, shape, size, colour, bold style, italic style, line spacing, or pitch type.

20. Apparatus according to claim 18, wherein said font information comprises parameters, wherein exemplary parameters comprise size, colour, style or line spacing, while the typeface, shape or pitch information is available at the receiver.

21. Apparatus according to claim 18, wherein said identifier pointing to the font information stream points to a descriptor, which identifies the font information stream.

22. Apparatus according to claim 18, further comprising means for receiving within a data stream control information determining whether or not the receiver should store said font information, wherein the received control information is provided to said means for storing font information.

* * * * *